US011940782B2

(12) United States Patent
Wang et al.

(10) Patent No.: US 11,940,782 B2
(45) Date of Patent: Mar. 26, 2024

(54) PRODUCT PERFORMANCE PREDICTION MODELING TO PREDICT FINAL PRODUCT PERFORMANCE IN CASE OF DEVICE EXCEPTION

(71) Applicant: Siemens Aktiengesellschaft, Munich (DE)

(72) Inventors: Jing Wang, Chengdu (CN); Hu Chen, Chengdu (CN); Zhi Yong Peng, Chengdu (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 541 days.

(21) Appl. No.: 17/261,614

(22) PCT Filed: Jul. 26, 2018

(86) PCT No.: PCT/CN2018/097256
§ 371 (c)(1),
(2) Date: Jan. 20, 2021

(87) PCT Pub. No.: WO2020/019256
PCT Pub. Date: Jan. 30, 2020

(65) Prior Publication Data
US 2021/0263508 A1    Aug. 26, 2021

(51) Int. Cl.
*G05B 19/418*    (2006.01)
*G06N 5/04*    (2023.01)
*G06N 20/00*    (2019.01)

(52) U.S. Cl.
CPC ......... *G05B 19/41875* (2013.01); *G06N 5/04* (2013.01); *G06N 20/00* (2019.01); *G05B 2219/32194* (2013.01)

(58) Field of Classification Search
CPC .... G05B 19/41875; G05B 2219/31264; G05B 2219/32368; G05B 17/02;
(Continued)

(56) References Cited

U.S. PATENT DOCUMENTS 6,301,515 B1 * 10/2001 Wagner ................ G05B 13/024
700/109
2005/0288812 A1    12/2005 Cheng et al.
(Continued)

FOREIGN PATENT DOCUMENTS

CN    101320031 A    12/2008
CN    102319883 A    1/2012
(Continued)

OTHER PUBLICATIONS

Written Opinion for International Application No. PCT/CN2018/097256 dated Apr. 26, 2019.
(Continued)

*Primary Examiner* — Chun Cao
(74) *Attorney, Agent, or Firm* — Harness, Dickey & Pierce, P.L.C.

(57) ABSTRACT

Provided are a product performance prediction modeling method and apparatus, a product performance prediction method, a product performance prediction system, a computer device, and a storage medium. The product performance prediction modeling method includes: acquiring first sample data, the first sample data including device outlier data generated in a process of manufacturing a product by a device; acquiring a production line configuration simulation parameter of a production line relating to a location of the device, and product information of the product manufactured by the production line; selecting a simulation model to perform simulation test on the performance of the product, to obtain product performance simulation data; and inputting
(Continued)

the device outlier data, the production line configuration simulation parameter, the product information and the product performance simulation data into a machine learning model to perform machine learning training, to obtain a product performance prediction model.

17 Claims, 15 Drawing Sheets

(58) Field of Classification Search
CPC .......... G05B 2219/32194; G06F 30/27; G06N 20/00; G06N 5/04
USPC .......................................................... 700/109
See application file for complete search history.

(56) References Cited

U.S. PATENT DOCUMENTS

| | | |
|---|---|---|
| 2006/0288260 A1 | 12/2006 | Xiao et al. |
| 2010/0318934 A1* | 12/2010 | Blevins ............ G05B 19/41875 700/110 |
| 2011/0282480 A1 | 11/2011 | Jang et al. |
| 2012/0083917 A1* | 4/2012 | Zhou ................ G05B 19/41875 700/110 |
| 2016/0330225 A1 | 11/2016 | Kroyzer et al. |
| 2021/0263508 A1 | 8/2021 | Wang et al. |

FOREIGN PATENT DOCUMENTS

| | | | |
|---|---|---|---|
| CN | 103217960 A | | 7/2013 |
| CN | 103745273 A | | 4/2014 |
| CN | 103809582 A | | 5/2014 |
| CN | 104375478 A | * | 2/2015 |
| CN | 104407589 A | | 3/2015 |
| CN | 105045243 A | | 11/2015 |
| CN | 107862468 A | | 3/2018 |
| CN | 108152612 A | | 6/2018 |
| EP | 3187948 A1 | | 7/2017 |
| EP | 3165973 B1 | | 1/2018 |
| EP | 3811241 A1 | | 4/2021 |
| JP | 2006275926 A | | 10/2006 |
| WO | WO 2015104691 A2 | | 7/2015 |

OTHER PUBLICATIONS

International Search Report and Written Opinion dated Apr. 26, 2019.

Cai Ya-Jun et al; "Optimization of Process Quality Monitoring"; Shenyang Institute of Automation Chinese Academy of Sciences1, Shengyang 110016, P. R. China; University of the Chinese Academy of Sciences2, Beijing 100049, P. R. China; Jun. 30, 2017; pp. 277-281.

* cited by examiner

PRODUCT PERFORMANCE PREDICTION MODELING TO PREDICT FINAL PRODUCT PERFORMANCE IN CASE OF DEVICE EXCEPTION

PRIORITY STATEMENT

This application is the national phase under 35 U.S.C. § 371 of PCT International Application No. PCT/CN2018/097256 which has an International filing date of Jul. 26, 2018, which designated the United States of America, the entire contents of which are hereby incorporated herein by reference.

FIELD

Embodiments of the present invention generally relate to the field of artificial intelligence, and more particularly to a product performance prediction modeling method, a product performance prediction modeling apparatus, a computer device, a computer-readable storage medium, a product performance prediction method, and a product performance prediction system.

BACKGROUND

In an industrial production process, the product performance is a very important factor. With the development of technology, various devices are applied to production lines of many industrial productions. However, since the integration level of the production line is increasingly high and the device operating environment is complicated, the occurrence of device faults becomes inevitable and accidental, thereby causing an exception. This exception will inevitably affect the performance of a product manufactured by the production line, and will affect the final product quality.

In a traditional technology, in order to predict the product performance before the final product approval, simulation software is usually adopted to perform simple performance verification.

SUMMARY

The inventors have discovered, however, since there are always some unknown differences between a real product manufacturing environment and analog data, for example, an emergency will happen to a machine in a production process, a performance prediction result and an actual performance will be different increasingly with the increase of accidents, and actual demands cannot be met.

Based on the foregoing technical problem, embodiments of the present invention provides a product performance prediction modeling method, a product performance prediction modeling apparatus, a computer device, a computer-readable storage medium, a product performance prediction method, and a product performance prediction system, capable of improving the accuracy of the product performance prediction.

An embodiment of the present invention provides a product performance prediction modeling method. The method includes:
  acquiring first sample data, wherein the first sample data includes device outlier data generated in a process of manufacturing a product by a device;
  acquiring a production line configuration simulation parameter of a production line where the device is located, and product information of the product manufactured by the production line;
  selecting, according to the device outlier data, the production line configuration simulation parameter and the product information, a product performance simulation model to perform simulation test on the performance of the product, so as to obtain product performance simulation data; and
  inputting the device outlier data, the production line configuration simulation parameter, the product information and the product performance simulation data into a machine learning model to perform machine learning training, so as to obtain a product performance prediction model.

Another embodiment of the present invention provides a product performance prediction method. The method includes:
  acquiring device outlier data;
  acquiring a production line configuration simulation parameter and product information corresponding to a production line where a device generating the device outlier data is located; and
  inputting the device outlier data, the production line configuration simulation parameter and the product information into the product performance prediction model established by means of the foregoing product performance prediction modeling method, so as to obtain a product performance prediction result corresponding to the device outlier data.

Another embodiment of the present invention provides a product performance prediction modeling apparatus. The apparatus includes:
  a sample acquisition module, configured to acquire first sample data, the first sample data including device outlier data generated in a process of manufacturing a product by a device;
  a parameter acquisition module, configured to acquire a production line configuration simulation parameter of a production line where the device is located, and product information of the product manufactured by the production line;
  a performance simulation module, configured to select, according to the device outlier data, the production line configuration simulation parameter and the product information, a product performance simulation model to perform simulation test on the performance of the product, so as to obtain product performance simulation data; and
  a modeling module, configured to input the device outlier data, the production line configuration simulation parameter, the product information and the product performance simulation data into a machine learning model to perform machine learning training, so as to obtain a product performance prediction model.

Another embodiment of the present invention also provides a computer device. The computer device includes a memory and a processor, wherein the memory stores a computer program, and the steps of any one of the method embodiments are implemented when the processor executes the computer program.

Another embodiment of the present invention also provides a computer-readable storage medium having a computer program stored thereon, wherein the steps of any one of the method embodiments are implemented when the computer program is executed by a processor.

Another embodiment of the present invention also provides a product performance prediction system. The system includes:
- at least one sensor, wherein the at least one sensor is configured to monitor a production line;
- a gateway, wherein the gateway is in communication connection with the sensor;
- a cloud platform, wherein the cloud platform is in communication connection with the gateway; and
- a computer device, wherein the computer device is in communication connection with the cloud platform, the computer device comprises a memory and a processor, the memory stores a computer program, and the steps of the method embodiments are implemented when the processor executes the computer program.

A product performance prediction system includes:
- a sensor, wherein the sensor is configured to monitor a production line;
- a gateway, wherein the gateway is in communication connection with the sensor; and
- a cloud platform, wherein the cloud platform is in communication connection with the gateway, and comprises a memory and a processor, the memory stores a computer program, and the steps of any one of the method embodiments are implemented when the processor executes the computer program.

The foregoing product performance prediction modeling method, product performance prediction method, product performance prediction modeling apparatus, product performance prediction system, computer device and storage medium simulate, according to device outlier data, a product performance and perform machine learning through a machine learning model, so that a mapping relationship between the device outlier data and the product performance can be obtained, a product performance prediction model is established, and therefore the product performance prediction model can accurately predict the final product performance in time in case of device exception, thereby improving the accuracy of the product performance prediction.

MAIN SYMBOL DESCRIPTION

| | |
|---|---|
| Sensor | 101, 102, 103 |
| Gateway | 104 |
| Cloud platform | 105 |
| Computer device | 106 |
| Processor | 1061 |
| Memory | 1062 |
| Network interface | 1063 |
| Product performance prediction modeling apparatus | 100 |
| Sample acquisition module | 1000 |
| Parameter acquisition module | 2000 |
| Category analysis unit | 2001 |
| Simulation parameter configuration unit | 2002 |
| Performance simulation module | 3000 |
| Modeling module | 4000 |
| Data classification unit | 4001 |
| Model training unit | 4002 |
| Model verification unit | 4003 |
| Accuracy calculation subunit | 4003a |
| Accuracy comparison subunit | 4003b |
| Prediction model update module | 5000 |
| Product performance prediction unit | 5001 |
| Prediction result comparison unit | 5002 |
| Simulation model update module | 6000 |
| Performance-related parameter acquisition module | 1000' |
| Outlier data determination module | 2000' |
| Data range acquisition unit | 2001' |
| Data range comparison unit | 2002' |
| Outlier data determination unit | 2003' |
| Performance-related parameter determination module | 3000' |
| Prediction result acquisition module | 4000' |

DETAILED DESCRIPTION OF THE EXAMPLE EMBODIMENTS

In order to make the objectives, technical solutions and advantages of the present invention clearer, the present invention will be further described in detail below with reference to the accompanying drawings and embodiments. It will be appreciated that specific embodiments described herein are merely used to explain the present invention, and are not used to limit the present invention.

Figure 1:
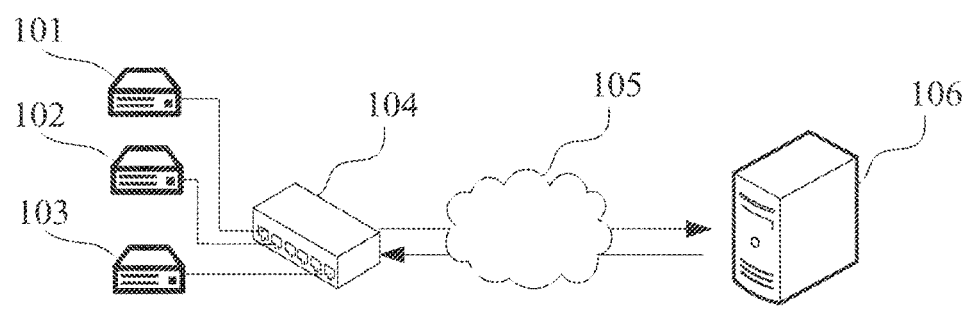
FIG. 1 is a framework diagram of a product performance prediction modeling system in an embodiment.

The embodiments of the present invention are applied to a prediction system framework diagram of a product performance prediction modeling method as shown in FIG. 1. The system framework diagram includes: a sensor 101, a sensor 102, a sensor 103, a gateway 104, a cloud platform 105 and a computer device 106. The sensor 101, the sensor 102 and the sensor 103 are configured to monitor a production line (not drawn in the figure) to obtain sample data. The sample data is, for example, one or more of an operating parameter of an industrial device, a device production environment parameter and a device service duration. The sensor 101, the sensor 102 and the sensor 103 are various Internet-of-things sensors such as any one of an audio sensor, an image sensor, a video sensor, a motion sensor and the like, which may be selected as required. The sensor 101, the sensor 102 and the sensor 103 may be disposed at different positions of the production line or integrated into a production device (not drawn in the figure) to detect the production line and the production device in the production line, so as to obtain parameters of the production line and the production device. It should be noted that the sample data in the embodiments of the present invention includes device parameters. The sensor 101, the sensor 102 and the sensor 103 as shown in FIG. 1 are merely enumerated herein, there may be more sensors, and the number of the sensors is not limited to this. In addition, the sample data in FIG. 1 in the embodiments of the present invention is received by the same gateway 104. In another embodiment, each sensor corresponds to an Internet-of-things gateway for receiving the sample data thereof.

Meanwhile, the cloud platform 105 is in communication connection with a plurality of gateways 104. Each gateway 104 may be disposed in different production lines of the same factory, or may also be disposed in factories at different locations in the same area, or may also be disposed in factories in different areas, so as to comb and classify the sample data acquired by the sensors and then to upload the data to the cloud platform 105. The computer device 106 operates a machine learning model, and is configured to learn the sample data collected by the cloud platform 105 and predict the performance of a product manufactured on the production line. The machine learning model is stored in the computer device 106. In an embodiment, the machine learning model is stored in the cloud platform 105.

Specifically, the gateway 104 in an embodiment of the present invention is a smart Internet-of-things gateway for an industrial Internet of things, which includes a data collection module, a communication module, a positioning module, a data processing chip module (not shown in the figure) and the like, is butted with a plurality of industrial devices or sensors, and supports Ethernet, RS485 serial port, RS232 serial port, wireless transmission and other uplink modes, or GPRS, 433 MHZ, 2.4 GHZ, WI-FI and other wireless transmission modes. Data exchange between different communication protocols and a plurality of servers is supported. The functions of data collection, data classification, data transmission, communication management, data receiving, protocol conversion, data processing forwarding and the like are integrated.

It is understandable that the foregoing content in the present embodiment merely describes a specific mode of acquiring device data of a corresponding industrial device in a production line. In actual application, other modes may also be adopted as long as the device data of the corresponding industrial device can be acquired. No specific limitation is made herein.

An embodiment of the cloud platform 105 is an Internet-of-things cloud platform, configured to process device data uploaded by the Internet-of-things gateway, the processing including: receiving, storing, managing, organizing, associating, comparing, and triggering. Specifically, the cloud platform 105 in the embodiment of the present invention is a data processing center composed of a plurality of server groups, each group being composed of a plurality of physical servers. The total capability of the cloud platform is the sum of concurrent processing capabilities borne on all single physical servers, thereby ensuring that a disaster recovery backup center can be established in many places without data service interruption.

The cloud platform 105 is also specifically configured to: receive corresponding data sent by the gateway 104, and store the data; maintain a series of logic rules such as an association relationship, an early warning model, threshold control, boundary condition setting, and the like; arrange, organize, associate and analyze the data; form a series of trigger mechanisms according to the logic rules; issue information (data) to the gateway 104; and provide the corresponding data received from the gateway 104 for other platforms, and the like.

The computer device 106 is a server or a computer, including a memory and a processor. The memory stores data sent by a machine learning system and the Internet-of-things gateway, data processed by the cloud platform 105, and the like. The processor is configured to operate the machine learning system to acquire information provided by an environment, and modify a knowledge base by using the information to enhance the task accomplishing efficiency of the processor. An execution portion accomplishes a task according to the knowledge base, performs deep learning by using the obtained information, and continuously performs repeated training by using the information. In an embodiment, the computer device 106 is a part of the cloud platform 105. That is, the computer device 106 is integrated into the cloud platform 105, the cloud platform 105 includes the foregoing memory and processor, and the memory stores the machine learning model.

Figure 2:
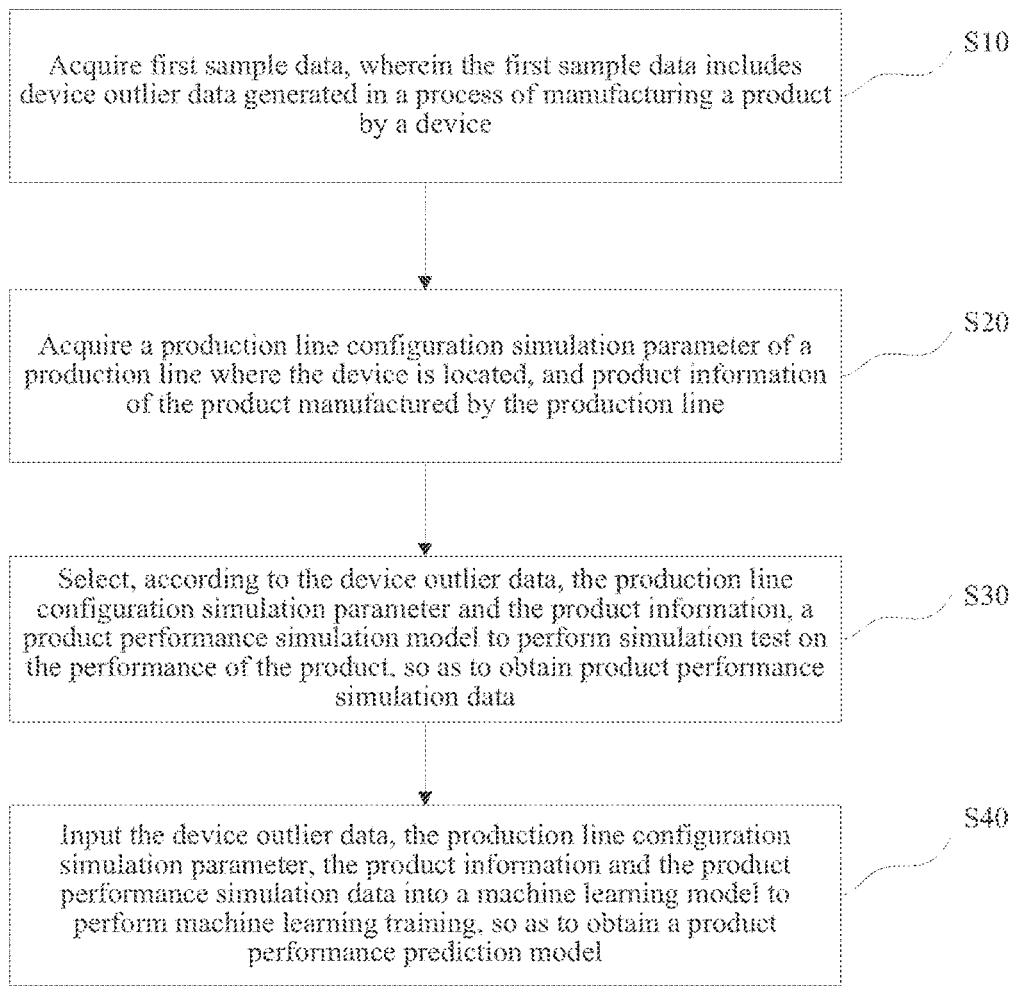
FIG. 2 is a flowchart of a product performance prediction modeling method in an embodiment.

Based on the foregoing system framework diagram of FIG. 1, referring to FIG. 2, a product performance prediction modeling method in one of the embodiments of the present invention includes:

S10: Acquire first sample data, wherein the first sample data includes device outlier data generated in a process of manufacturing a product by a device.

After the gateway 104 uploads original data acquired by the sensor 101, the sensor 102 and the sensor 103 to the cloud platform 105, the cloud platform 105 may preliminarily screen the original data to obtain first sample data. Meanwhile, the computer device 106 may analyze the first sample data to recognize device outlier data generated in the product manufacturing process in case of device exception. The first sample data may be stored on the cloud platform 105, in order that the computer device 106 directly calls the foregoing data from the cloud platform 105. The device outlier data may include a device operation fault parameter, a device production environment fault parameter, a device expiration parameter, and the like. It is understandable that in another implementation manner, the first sample data and related data are stored in other memories associated with the cloud platform 105, and the cloud platform performs standardized cleaning on the original data to eliminate obvious wrong data and the like in the original data, so as to obtain the standardized first sample data.

S20: Acquire a production line configuration simulation parameter of a production line where the device is located, and product information of the product manufactured by the production line.

The configurations of different production lines in different industries may be completely different, and devices in a production line are also different. Even if the production lines are the same, configured operation parameters may be different. Therefore, in order to accurately simulate a production line, it is necessary to acquire a production line configuration simulation parameter matching sample data, in order to subsequently select a corresponding simulation model to simulate a production line where a device is located. The production line configuration simulation parameter is a simulation parameter generated from configuration parameters of various devices in the production line, operation parameters, production environment parameters and the like. The foregoing device configuration parameter may be an own configuration parameter of a device, and different devices have different configuration parameters. For example, the configuration parameter includes an input power, an output power, a rated current, a mechanical performance parameter or the like. The operation parameter may be current or voltage. The device production environment parameter may be temperature, air pressure, air humidity or the like. The configuration parameter is specifically determined by actual parameters of a specific device. The product information is information related to the attribute of this product, which may include an affiliated area of the product, an affiliated factory of the product, a production device corresponding to the product, each sensor identifier in a production line for manufacturing the product, and the like.

In an embodiment, a database is established for the device, the production line configuration simulation parameter and the product information about the manufactured product, and the foregoing data is stored in the form of the database.

S30: Select, according to the device outlier data, the production line configuration simulation parameter and the product information, a product performance simulation model to perform simulation test on the performance of the product, so as to obtain product performance simulation data.

After the production line configuration parameter, the product information and the outlier data are determined, a product performance simulation model matching the production line may be selected to perform simulation test on the performances of the product such as a fatigue life, a progressive damage growth and a 3D simulation degree (e.g., 3D CAD/CAE), so as to obtain a final simulation result about the product performance. It is understandable that for different industrial fields and production lines, a product performance simulation model, such as Simcenter or the like, commonly used in this industrial field may be selected. Meanwhile, during test, a test device and a test environment may be simulated. That is, simulation data of the test device and simulation data of the test environment, serving as input data, are input into the product performance simulation model for simulation. The simulation data of the test device may be selected according to the adopted test device, and the simulation data of the test environment includes a fluid parameter, a structure parameter, an electrical parameter or the like, and may be selected according to the environment and condition where the product performance test is performed. The product performance simulation data includes the performance of the product obtained by a simulation model, such as a fatigue life and the like. In a specific embodiment, the product performance simulation data further includes the type of the selected simulation model. Different production lines have different simulation models, including a conventional simulation model matching different production lines. The simulation model may be stored in the cloud platform 105, or may also be stored in the computer device 106.

S40: Input the device outlier data, the production line configuration simulation parameter, the product information and the product performance simulation data into a machine learning model to perform machine learning training, so as to obtain a product performance prediction model.

After being received by the cloud platform 105, the device outlier data, the production line configuration simulation parameter, the product information and the product performance simulation data may be input into the machine learning model in the computer device 106 to perform machine learning training, so that a mapping relationship between different device outlier data and product performance simulation data can be obtained, and a product performance prediction model is obtained.

The product performance prediction modeling method provided in the foregoing embodiment simulates a product performance according to device outlier data to obtain product performance simulation data, and then performs machine learning by using a machine learning model based on the device outlier data and the product performance simulation data, so that a mapping relationship between the device outlier data and the product performance can be obtained, a product performance prediction model is established, and therefore the product performance prediction model can accurately predict the final product performance in time in case of device exception, thereby improving the accuracy of the product performance prediction. Thus, a producer can early intervene in adjustment, thereby reducing the production cost. Meanwhile, the foregoing method also reduces the amount of data needing to be processed in operation of the computer device 106 during subsequent product performance prediction, improves the efficiency of a computer, and also increases the calculation operation speed of the computer device 106.

Figure 3:
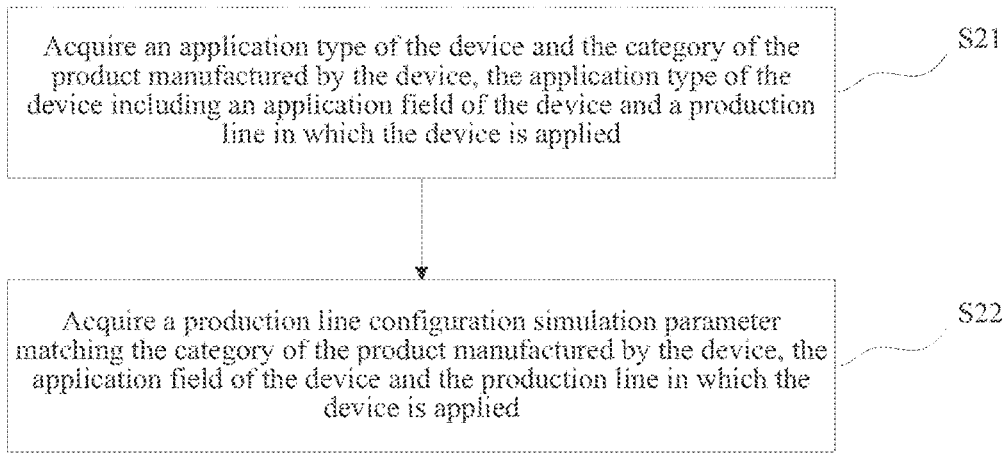
FIG. 3 is a flowchart showing acquisition of a product line configuration simulation parameter and product information in an embodiment.

Referring to FIG. 3 as well, in an embodiment, in order to more accurately determine a device configuration simulation parameter, the step of acquiring a production line configuration simulation parameter of a production line where the device is located, and product information of the product manufactured by the production line may include:

S21: Acquire an application type of the device and the category of the product manufactured by the device, the application type of the device including an application field of the device and a production line in which the device is applied.

S22: Acquire the production line configuration simulation parameter matching the category of the product manufactured by the device, the application field of the device and the production line in which the device is applied.

When the device is applied to different industrial fields, simulation results about the product performance are differently affected. When the device is applied to different production lines, the product performance simulation is also differently affected. Meanwhile, when the product categories of the products manufactured by the device are different, the simulation result may also be affected in a subsequent simulation process. Therefore, in order to more accurately simulate the production process, before the production line configuration simulation parameter is determined, it is necessary to take these factors as reference. By taking the application field of the device, the production line in which the device is applied and the category of the product manufactured by the device as reference of the production line configuration simulation parameter, an actual situation of the production line can be more truly reflected, thus improving the accuracy of the subsequent product performance simulation. In addition, in the same industrial field, a plurality of simulation software may be selected for simulation according to the application category and the product category, so that a plurality of product performance simulation results can be obtained as samples of subsequent machine learning training, referring to Table 1.

TABLE 1

| Product category | Simulation model | Device outlier data | Fatigue life | 3D CAD/CAE | ... |
|---|---|---|---|---|---|
| Prod #1 | Simulator #1 | Outlier data #1 | Life #1 | File #1 | ... |
| Prod #2 | Simulator #2 | Outlier data #2 | Life #2 | File #2 | ... |
| ... | ... | ... | ... | ... | ... |

In one of the embodiments, after the device outlier data, the production line configuration simulation parameter and the product information are determined, a corresponding simulation model may be selected to perform simulation test on the performance of the product, so as to obtain product performance simulation data. The product performance simulation data may include: a product fatigue life, a progressive damage growth and a 3D simulation degree (e.g., 3D CAD/CAE), wherein the 3D simulation degree refers to a difference between a simulation result and an actual situation. As the difference is smaller, it is indicated that the simulation result is more approximate to an actual result. For example, the production situation of a whole set of real production line is simulated by the simulation model. If a product performance simulation result may be basically consistent with a real result, it is indicated that the simulation model basically matches the production line, a real production line does not need to be built, and the production situation can be mastered in order for improvement in advance, thereby greatly reducing the production cost, and improving the efficiency.

Figure 4:
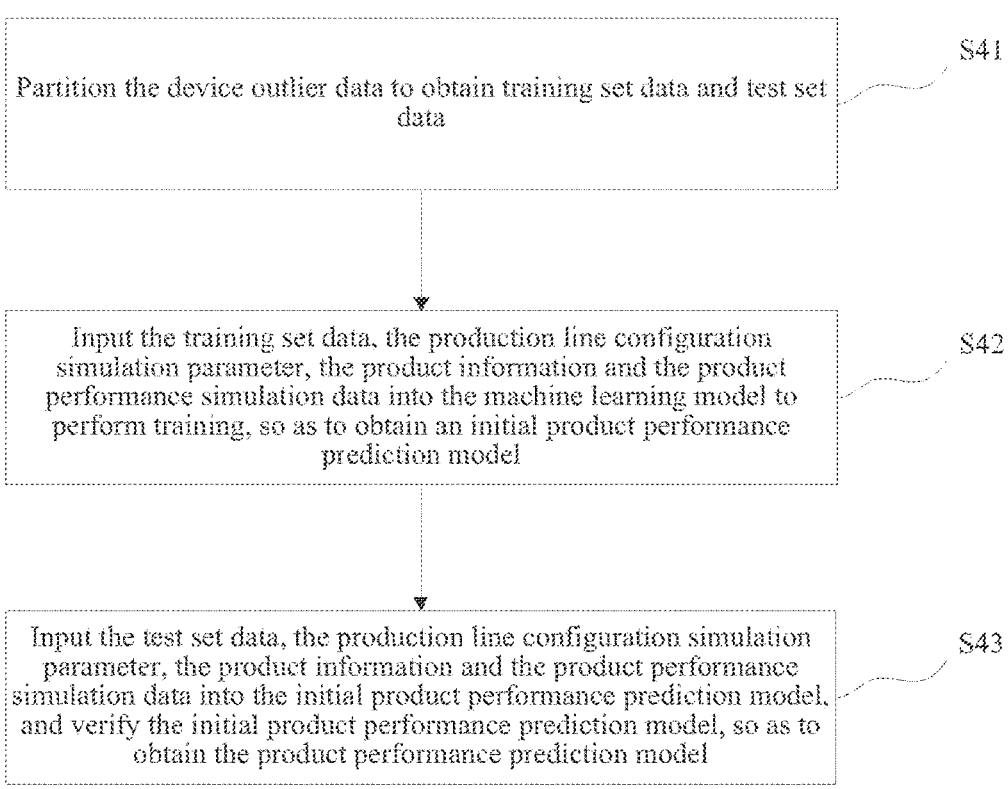
FIG. 4 is a flowchart showing establishment of a product performance prediction model through machine learning training in an embodiment.

In an embodiment, referring to FIG. 4 as well, in order to optimize the product performance prediction model, step S40 further includes:

S41: Partition the device outlier data to obtain training set data and test set data.

After the cloud platform 105 obtains the device outlier data in the first sample data, the device outlier data may be partitioned into training set data and test set data. Specifically, in the present embodiment, the device outlier data may be partitioned in a certain proportion. For example, the device outlier data may be partitioned into 70% of the training set data and 30% of the test set data, or may be partitioned into 80% of the training set data and 20% of the test set data, which will not be limited herein.

S42: Input the training set data, the production line configuration simulation parameter, the product information and the product performance simulation data into the machine learning model to perform training, so as to obtain an initial product performance prediction model.

After the processed device outlier data is partitioned into the training set data and the test set data, the product performance prediction model is trained by using the training set data, so as to obtain an initial product performance prediction model. Specifically, a prediction model may be established based on a supervised machine learning method, the product performance prediction model may be trained by using a back propagation algorithm, and an error-minimum parameter value of an artificial neural network of the product performance prediction model may be solved by continuously using gradient descent, so as to obtain a product performance prediction model including a locally optimal artificial neural network. It should be noted that in the present embodiment, the product performance prediction model trained by using the training set data may be a product performance prediction model established by using a random forest algorithm and the like in advance.

S43: Input the test set data, the production line configuration simulation parameter, the product information and the product performance simulation data into the initial product performance prediction model, and verify the initial product performance prediction model, so as to obtain the product performance prediction model.

It is understandable that after the initial product performance prediction model is obtained, the product performance prediction may be further verified and tested by using the test set data, the production line configuration simulation parameter, the product information and the product performance simulation data. After test verification is performed through the test set data, if a preset condition is satisfied, a final product performance prediction model is obtained. That is, an initial product performance prediction model having a verification result satisfying the preset condition is determined as a final product performance prediction model. The foregoing method can optimize the product performance prediction model according to different application scenarios, so that a subsequent product performance prediction result more satisfies an actual product performance.

Figure 5:
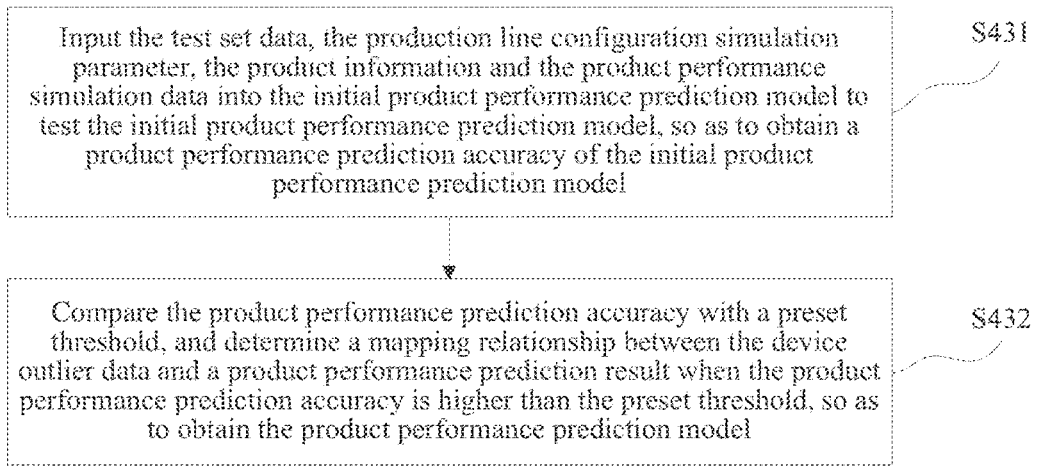
FIG. 5 is a flowchart showing test on a product performance prediction model through test set data in an embodiment.

In an embodiment, referring to FIG. 5 as well, in order to improve the prediction accuracy of the initial product performance prediction model, a final product performance prediction model may be obtained by using the test set data through the following steps:

S431: Input the test set data, the production line configuration simulation parameter, the product information and the product performance simulation data into the initial product performance prediction model to test the initial product performance prediction model, so as to obtain a product performance prediction accuracy of the initial product performance prediction model.

S432: Compare the product performance prediction accuracy with a preset threshold, and determine a mapping relationship between the device outlier data and a product performance prediction result when the product performance prediction accuracy is higher than the preset threshold, so as to obtain the product performance prediction model.

In step S431, the test set data is input into the initial product performance prediction model, so as to obtain a product performance prediction accuracy of the initial product performance prediction model. Specifically, the test set data is input into the initial product performance prediction model, an error between an output result of the initial product performance prediction model and an actual product performance is obtained by comparison, and a variance between a prediction result and the actual product performance is calculated, so as to obtain the product performance prediction accuracy of the initial product performance prediction model.

In step S432, after the accuracy of the initial product performance prediction model is obtained, the initial product performance prediction model is verified by using the accuracy, and it may be detected whether the initial product performance prediction model can accurately predict the product performance by judging whether the accuracy is higher than a preset threshold. If the accuracy of the initial product performance prediction model is higher than the preset threshold, it is indicated that the initial product performance prediction model can accurately predict the product performance, and it may be determined that the accuracy of the initial product performance prediction model reaches the standard. That is, the initial product performance prediction model may be used as a final product performance prediction model for prediction.

Figure 6:
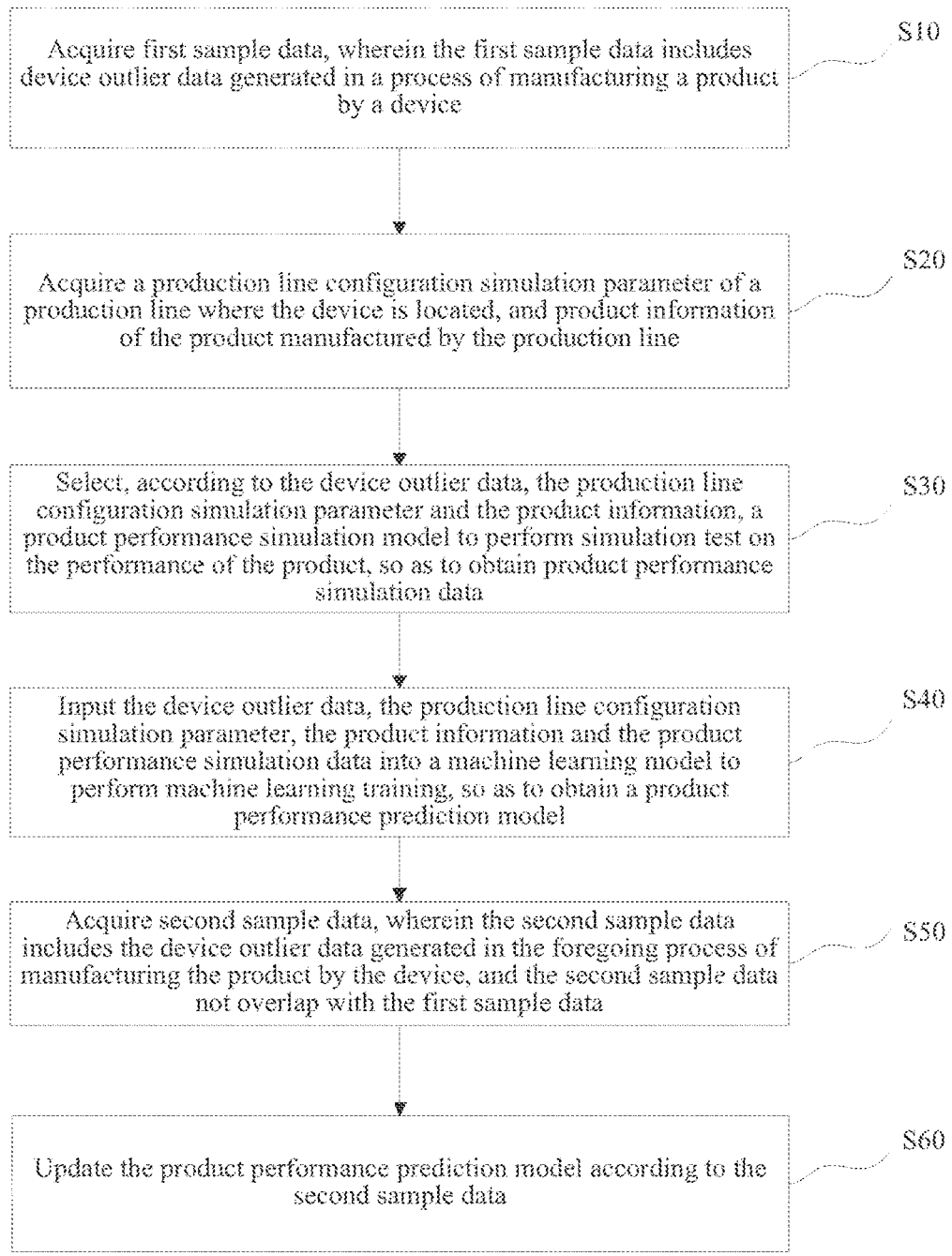
FIG. 6 is a flowchart showing update of a product performance prediction model in an embodiment.

In one of the embodiments, due to the change of a production line, a production device, a production environment, a production process and a using environment, it is necessary to update the product performance prediction model, so as to improve the accuracy of the product performance prediction. Referring to FIG. 6 as well, the method further includes:

S10: Acquire first sample data, wherein the first sample data includes device outlier data generated in a process of manufacturing a product by a device.

S20: Acquire a production line configuration simulation parameter of a production line where the device is located, and product information of the product manufactured by the production line.

S30: Select, according to the device outlier data, the production line configuration simulation parameter and the product information, a product performance simulation model to perform simulation test on the performance of the product, so as to obtain product performance simulation data.

S40: Input the device outlier data, the production line configuration simulation parameter, the product information and the product performance simulation data into a machine learning model to perform machine learning training, so as to obtain a product performance prediction model.

S50: Acquire second sample data, wherein the second sample data includes the device outlier data generated in the foregoing process of manufacturing the product by the device, and the second sample data does not overlap with the first sample data.

S60: Update the product performance prediction model according to the second sample data.

Steps S10 to S40 are consistent with the foregoing corresponding parts. The descriptions thereof are omitted herein.

If the accuracy of the product performance prediction is lower than the preset threshold, or in order to make the product performance prediction model with the standard accuracy capable of more accurately predicting the product performance, the computer device 106 may continuously acquire second sample data from the cloud platform 105, match the device outlier data and the product performance for the model by using the second sample data, and update the product performance prediction model, thereby ensuring that the product performance prediction model may be updated in time according to the change of device data and may accurately predict the final product performance in case of any device exception. The condition that the second sample data does not overlap with the first sample data refers to that the second sample data is different from the first sample data, that is, sample data included in the second sample data is different from sample data in the first sample data.

Figure 7:
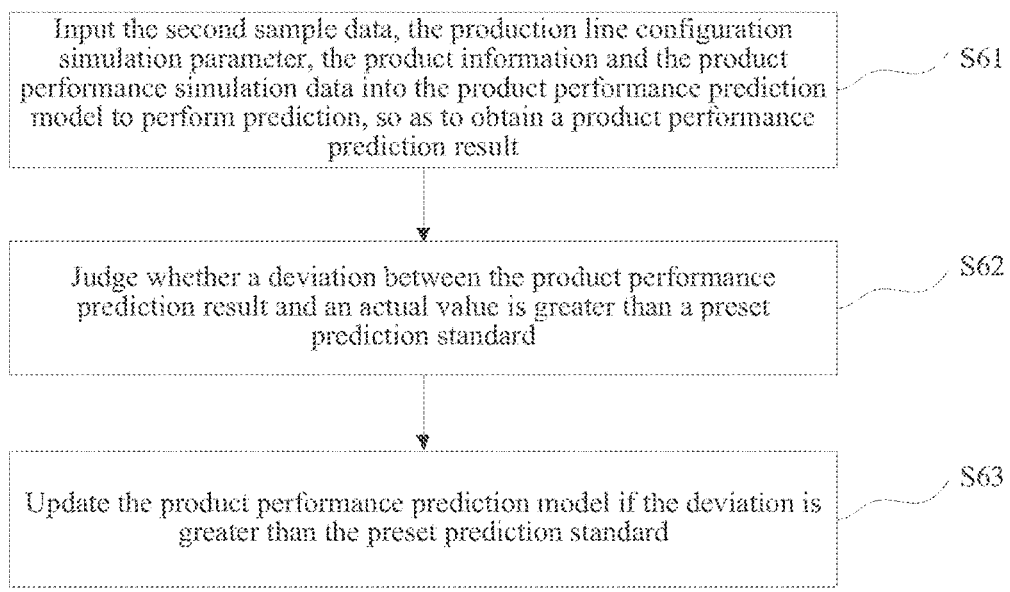
FIG. 7 is a flowchart showing further update of a product performance prediction model in an embodiment.

Referring to FIG. 7 as well, in order to update the product performance model and improve the prediction accuracy of the product performance prediction model, the product performance prediction model may be updated through the following steps:

S61: Input the second sample data, the production line configuration simulation parameter, the product information and the product performance simulation data into the product performance prediction model to perform prediction, so as to obtain a product performance prediction result.

S62: Judge whether a deviation between the product performance prediction result and an actual value is greater than a preset prediction standard.

After a prediction result is obtained through the product performance prediction model, the prediction result may be compared with an actual product performance to judge whether a deviation between the prediction result and an actual value is greater than a preset prediction standard.

S63: Update the product performance prediction model if the deviation is greater than the preset prediction standard.

If the product performance prediction model judges that the deviation between the prediction result and the actual value is greater than the preset prediction standard, it is indicated that the prediction accuracy of the product performance prediction model is not high enough, the device may be at risk in production, and the performance of the manufactured product may be defective. Therefore, the computer device 106 may continuously acquire second sample data to train and update the product performance prediction model until the accuracy of the product performance prediction model reaches a preset threshold.

In the present embodiment, a product performance prediction model of which the accuracy is higher than the preset threshold may continuously acquire second sample data for continuous update, and may continuously optimize the accuracy of the product performance prediction model, thereby improving the accuracy of the product performance prediction of the product performance prediction model in case of device exception. Meanwhile, a product performance prediction model of which the accuracy is lower than the preset threshold may continuously acquire second sample data to be trained again until the accuracy of the product performance prediction model reaches the preset threshold, and the product performance can be accurately predicted.

Since the production line configuration or the production environment may change during an actual production process of the product, a simulation parameter of the simulation model such as a device simulation parameter or a performance test simulation parameter or the like may be different from an actual value. Therefore, in order to further improve the accuracy of the product performance simulation of a simulation stage, the simulation parameter may be adjusted according to the difference between the product performance prediction result and the preset prediction standard. Specifically, if the deviation is greater than the preset prediction standard, the production line configuration simulation parameter is adjusted until the deviation between the product performance prediction result and the actual value is smaller than the preset prediction standard.

When the deviation between the product performance prediction result and the actual value is greater than the preset prediction standard, the simulation parameter of the simulation model may be adjusted, so that the deviation between a final prediction result and the actual value is smaller than the preset standard, the requirements of performance prediction are met, and therefore the accuracy of the subsequent product performance simulation can be improved, thus improving the accuracy of the subsequent product performance prediction. In the present embodiment, the simulation degree of simulation software can be further improved by the foregoing feedback mechanism.

Figure 8:
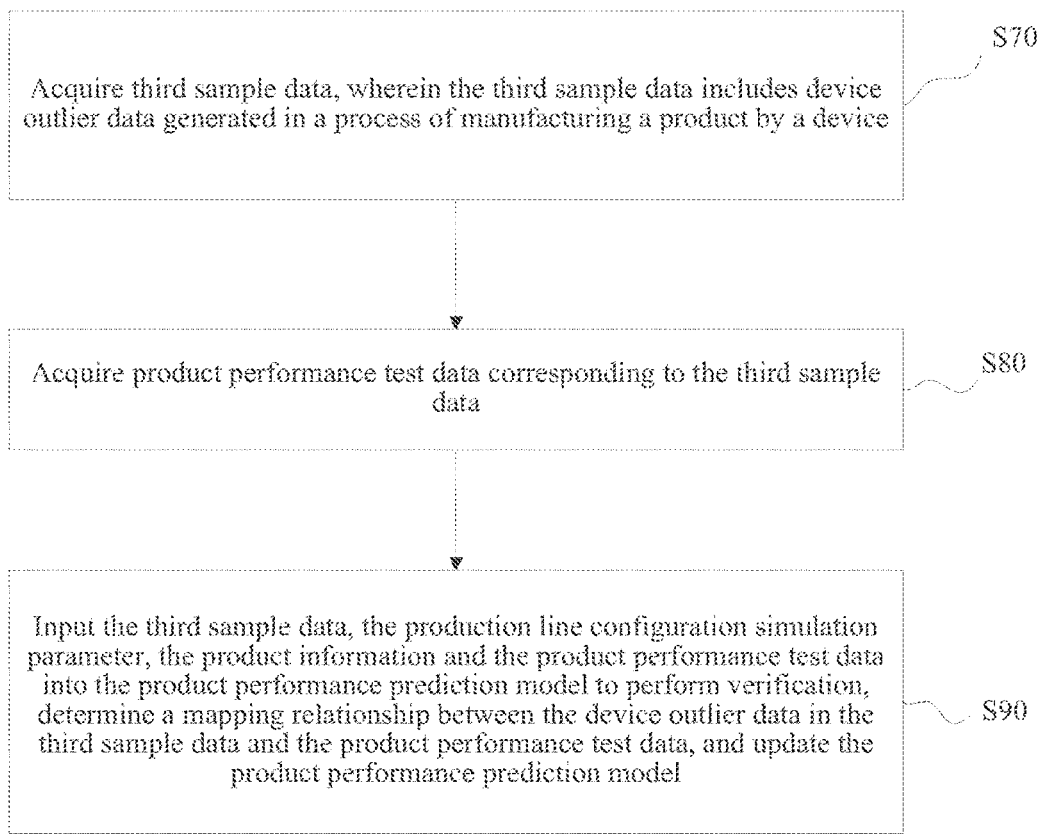
FIG. 8 is a flowchart showing further verification of a product performance prediction model in an embodiment.

In addition, since the product performance simulation data obtained by the simulation model may deviate, an output result of the product performance prediction model may also deviate from an actual product performance test result. Therefore, the product performance prediction model may be verified by using a real product performance test result, so as to judge whether it is necessary to update the product performance prediction model. In an embodiment, referring to FIG. 8 as well, the method may include:

- S70: Acquire third sample data, wherein the third sample data includes the device outlier data generated in the foregoing process of manufacturing the product by the device.
- S80: Acquire product performance test data corresponding to the third sample data.
- S90: Input the third sample data, the production line configuration simulation parameter, the product information and the product performance test data into the product performance prediction model to perform verification, determine a mapping relationship between the device outlier data in the third sample data and the product performance test data, and update the product performance prediction model.

The product performance test data is real product performance test data obtained by testing the obtained product through a real product performance test platform whilst the third sample data is obtained in case of exception of the device in the production line. That is to say, the product performance test data in step S80 is product performance test data obtained after the product performance is actually tested, namely real data. In a specific embodiment, the device outlier data in the third sample data includes the device outlier data in the first sample data and the device outlier data in the second sample data. It is understandable that after the exception of the production line, according to a mode, current outlier data is recorded, after the production of the whole production line is completed, the product is taken down for special performance detection, and for example, a special performance test workbench is needed to test the performance; and according to another mode, the exceptional product may be taken down directly at this time for direct performance test, and for example, a special workbench is needed to test the performance. A specific scheme may be selected according to actual situations or requirements.

By inputting the device outlier data and the product performance test data into the product performance prediction model as verification samples, the product performance prediction model may be further verified to determine a mapping relationship between the device outlier data and the real product performance test data, and the product performance prediction model is further updated. Since the real product performance test data is adopted, the obtained product performance prediction model has a higher prediction accuracy.

Figure 9:
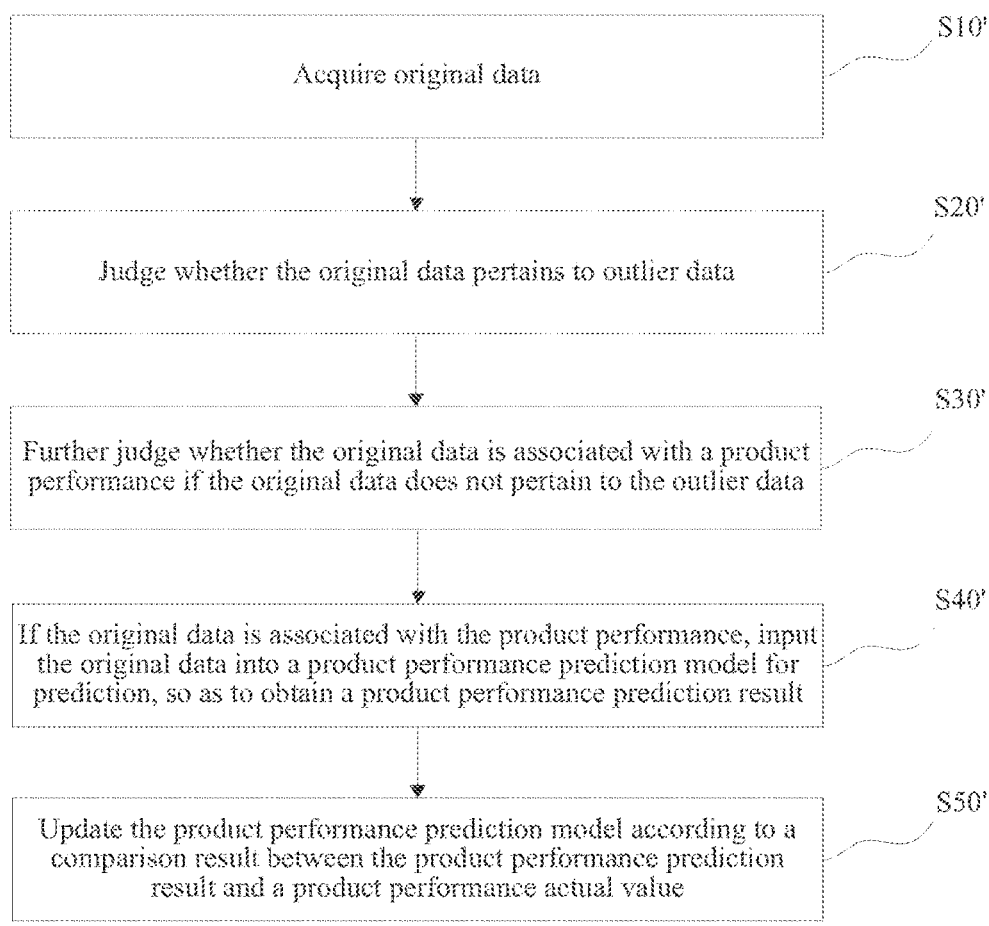
FIG. 9 is a flowchart showing update of a product performance prediction model in an embodiment.

In an embodiment, referring to FIG. 9 as well, in order to further improve the accuracy of the product performance prediction, machine learning training may be performed on data which is not the device outlier data but affects the later product performance, and the prediction model is updated according to a training result. The method includes:

- S10': Acquire original data.
- S20': Judge whether the original data pertains to outlier data.
- S30': Further judge whether the original data is associated with a product performance if the original data does not pertain to the outlier data.
- S40': Input, if the original data is associated with the product performance, the original data into the product performance prediction model for prediction, so as to obtain a product performance prediction result.
- S50': Update the product performance prediction model according to a comparison result between the product performance prediction result and a product performance actual value.

In the present embodiment, the cloud platform 105 may continuously acquire original data and recognize whether the original data pertains to device outlier data. If the original data does not pertain to the outlier data, it may be further judged whether the original data is associated with the product performance according to a pre-defined data range. If the original data is associated with the product performance, the original data is input into a product performance prediction model for prediction, so as to obtain a product performance prediction result integrating parameters associated with the product performance. In addition, a prediction result is compared with an actual value, and if the deviation exceeds a preset threshold, it may be indicated that the original data affects the product performance prediction, and therefore it is necessary to update the product performance prediction model. By means of the foregoing update, the product performance prediction model can more comprehensively take the influence of all factors into consideration, and a corresponding relationship between the device outlier data and the product performance can be accurately predicted, so that the product performance can be more accurately predicted later.

It is understandable that the device outlier data may be judged by a specialist or technician, and may also be judged in a machine learning way, which is not limited herein.

Figure 10:
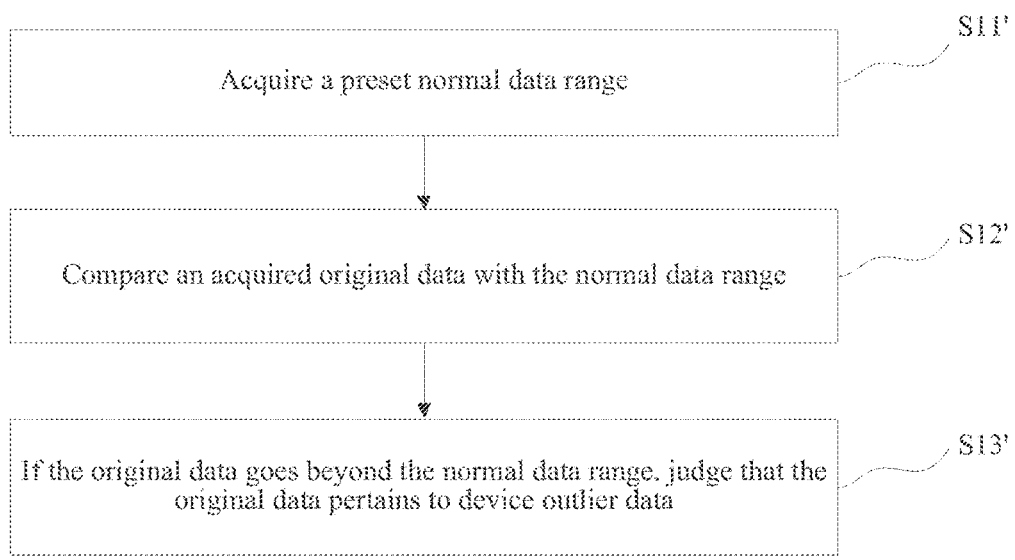
FIG. 10 is a flowchart of an outlier data determination method in an embodiment.

In one of the embodiments, optionally, it may be judged whether the original data pertains to the device outlier data by comparing the original data with a preset normal data range. Referring to FIG. 10 as well, the method may include:

- S11': Acquire a preset normal data range.
- S12': Compare an acquired original data with the normal data range.
- S13': If the original data goes beyond the normal data range, judge whether the original data pertains to device outlier data.

In the present embodiment, the normal data range may be set based on experience, or may also be set by a professional in advance. Meanwhile, by comparing the original data with the normal data range, it may be judged whether the original data pertains to the device outlier data. By means of the method, original data may be quickly and accurately identified.

Figure 11:
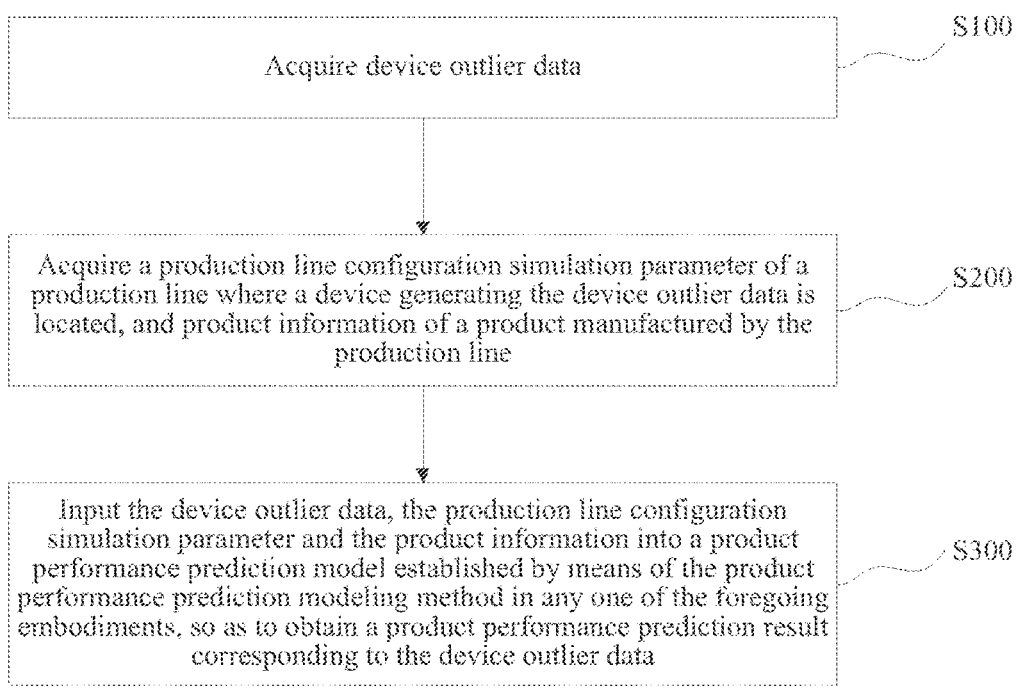
FIG. 11 is a flowchart of a product performance prediction method provided in an embodiment.

Referring to FIG. 11 as well, based on the above product performance prediction model, in order to predict the product performance, an embodiment of the present invention also provides a product performance prediction method, including:

- S100: Acquire device outlier data.
- S200: Acquire a production line configuration simulation parameter of a production line where a device generating the device outlier data is located, and product information of the product manufactured by the production line.
- S300: Input the device outlier data, the production line configuration simulation parameter and the product information into the product performance prediction model established by means of the product performance prediction modeling method in any one of the foregoing embodiments, so as to obtain a product performance prediction result corresponding to the device outlier data.

In the present embodiment, after device outlier data is acquired, the device outlier data and related parameters are input into a product performance prediction model, so that the product performance can be predicted based on a mapping relationship established in advance, thereby obtaining a product performance prediction result.

The product performance prediction modeling method provided in the foregoing embodiment performs performance prediction by inputting device outlier data into a product performance prediction model, so that the final product performance can be accurately predicted in time according to a mapping relationship established in advance between the device outlier data and the product performance, thereby improving the accuracy of the product performance prediction. Thus, a producer can early intervene in adjustment, thereby reducing the production cost. Meanwhile, the foregoing method also reduces the amount of data needing to be processed in operation of the computer device 106 during subsequent product performance prediction, improves the efficiency of a computer, and also increases the calculation operation speed of the computer device 106.

As one of the embodiments, in order to more accurately predict the product performance, the step of acquiring a production line configuration simulation parameter corresponding to a production line where a device generating the device outlier data is located and product information includes:

S210: Acquire an application type of the device generating the device outlier data and the category of the product manufactured by the device, the application type of the device including an application field of the device and a production line in which the device is applied.

S220: Acquire a production line configuration simulation parameter matching the category of the product manufactured by the device, the application field of the device and the production line in which the device is applied.

The foregoing steps correspond to S21 and S22 above. The descriptions thereof are omitted herein.

As one of the embodiments, since there are different simulation models in various industries or industrial fields, the whole production line and the production process may be simulated. In order to improve the simulation degree of a product performance simulation model, the method further includes:

S400: Acquire an initial product performance simulation model according to the device outlier data, the production line configuration simulation parameter and the product information.

S500: Correct a model parameter of the initial product performance simulation model according to the product performance prediction result, so that a deviation between product performance simulation data of the initial product performance simulation model and the product performance prediction result satisfies a preset standard, and the product performance simulation model is obtained.

In an embodiment, the initial product performance simulation model in step S400 is pre-defined in the industry, and each production line and a manufactured product have a preset initial product performance simulation model such as Simcenter and the like.

In the foregoing embodiment, an output result of a product performance prediction model is fed back to a product performance simulation model, so that the simulation degree of the product performance simulation model can be further improved, and the product performance simulation model can also simulate the product performance in case of subsequent exception of a production device, thereby implementing digitization of the whole test flow, and facilitating subsequent system integration. When the simulation result of the product performance simulation model is not accurate enough, the initial product performance simulation model is updated and upgraded. The product performance is simulated by using the updated and upgraded product performance simulation model to obtain new product performance simulation data for subsequently updating a product performance prediction model by turns, so that both the product performance simulation model and the product performance prediction model are more and more accurate.

Figure 12:
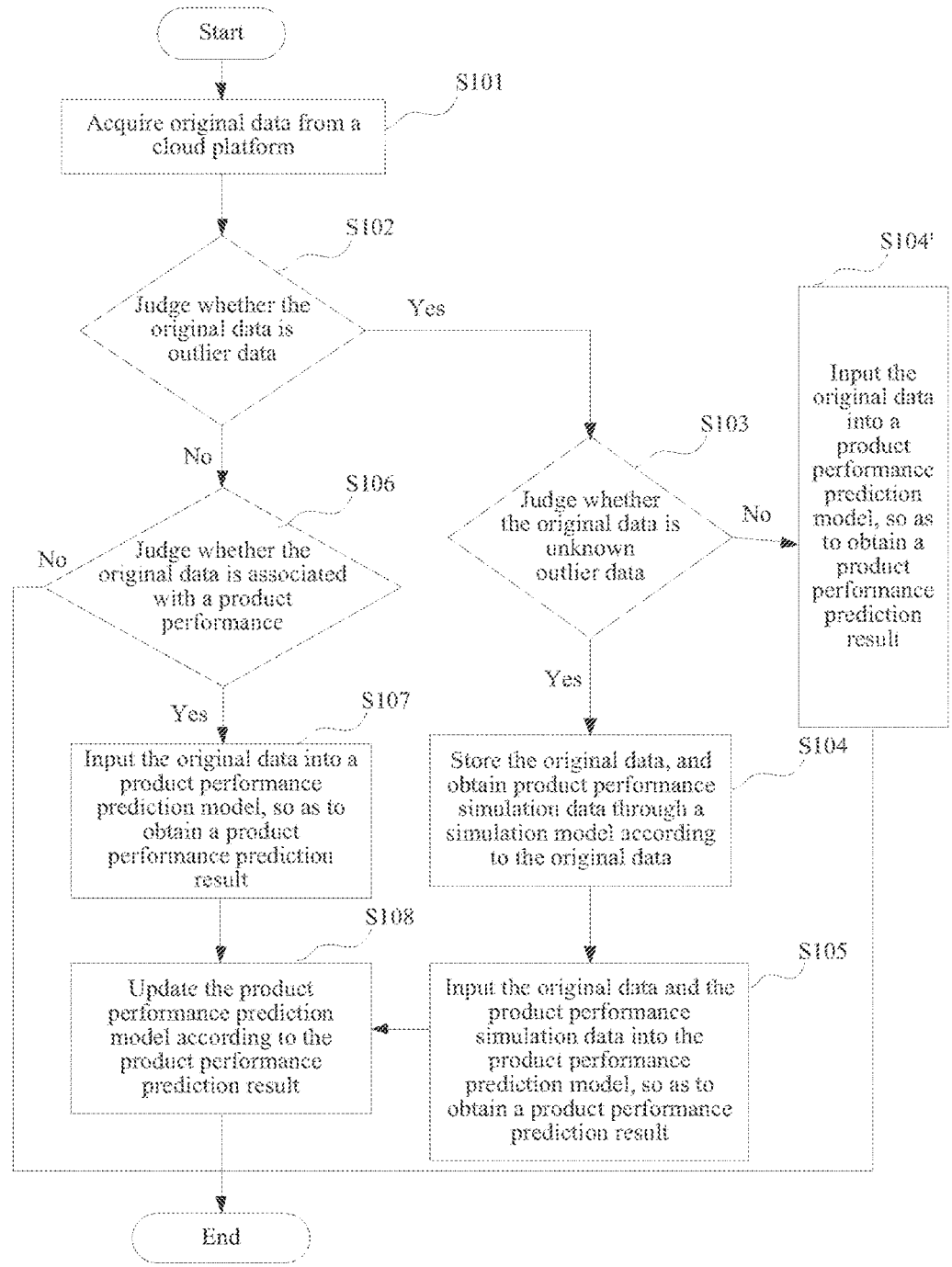
FIG. 12 is a flowchart of a product performance prediction method in an embodiment.

Referring to FIG. 12 as well, as a specific embodiment, the present invention also provides a product performance prediction modeling method, including:

S101: Acquire original data from a cloud platform 105.

S102: Judge whether the original data pertains to device outlier data, if the original data is the device outlier data, perform S103, and otherwise, perform S106.

S103: Judge whether the device outlier data is a known device outlier data, if the device outlier data is unknown device outlier data, perform S104, and if the device outlier data is a known device exception parameter, perform S104'.

S104: Store the unknown device outlier data, obtain product performance simulation data through a simulation model according to the unknown device outlier data, and perform S105.

S105: Input the unknown device outlier data and the product performance simulation data into a product performance prediction model to obtain a product performance prediction result, and perform S108.

S108: Update the product performance prediction model according to the product performance prediction result.

S104': Input the original data into the product performance prediction model, so as to obtain a product performance prediction result.

S106: Judge whether the original data is associated with the product performance, and if the original data is associated with the product performance, perform S107.

S107: Input the original data into the product performance prediction model, so as to obtain a product performance prediction result, and perform S108.

In the foregoing embodiment, the product performance prediction modeling method provided in the foregoing embodiment performs performance prediction by inputting device outlier data into a product performance prediction model, so that the final product performance can be accurately predicted in time, thereby improving the accuracy of the product performance prediction. Thus, a producer can early intervene in adjustment, thereby reducing the production cost. In addition, it is judged whether data is associated with the product performance, a product performance prediction result is obtained in time if so, and the product performance prediction model is updated, so that the accuracy of the product performance prediction model can be further improved. Meanwhile, the foregoing method also reduces the amount of data needing to be processed in operation of the computer device 106 during subsequent product performance prediction, improves the efficiency of a computer, and also increases the calculation operation speed of the computer device 106.

Figure 13:
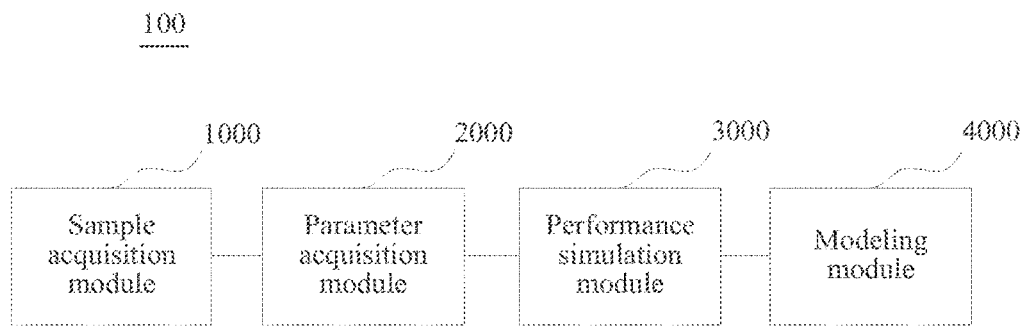
FIG. 13 is a framework diagram of a product performance prediction modeling apparatus in an embodiment.

Referring to FIG. 13 as well, in correspondence to the foregoing product performance prediction modeling method, an embodiment of the present invention also provides a product performance prediction modeling apparatus 100, including:

- a sample acquisition module 1000, configured to acquire first sample data, wherein the first sample data includes device outlier data generated in a process of manufacturing a product by a device;
- a parameter acquisition module 2000, configured to acquire a production line configuration simulation parameter of a production line where the device is located, and product information of the product manufactured by the production line;
- a performance simulation module 3000, configured to select, according to the device outlier data, the production line configuration simulation parameter and the product information, a product performance simulation model to perform simulation test on the performance of the product, so as to obtain product performance simulation data; and
- a modeling module 4000, configured to input the device outlier data, the production line configuration simulation parameter, the product information and the product performance simulation data into a machine learning model to perform machine learning training, so as to obtain a product performance prediction model.

In correspondence to the product performance prediction modeling method, the product performance prediction modeling apparatus provided in the foregoing embodiment simulates a product performance according to device outlier data to obtain product performance simulation data, and then performs machine learning by using a machine learning model based on the device outlier data and the product performance simulation data, so that a mapping relationship between the device outlier data and the product performance can be obtained, a product performance prediction model is established, and therefore the product performance prediction model can accurately predict the final product performance in time in case of device exception, thereby improving the accuracy of the product performance prediction. Thus, a producer can early intervene in adjustment, thereby reducing the production cost. Meanwhile, the foregoing apparatus also reduces the amount of data needing to be processed in subsequent product performance prediction operation, and improves the prediction efficiency.

Figure 14:
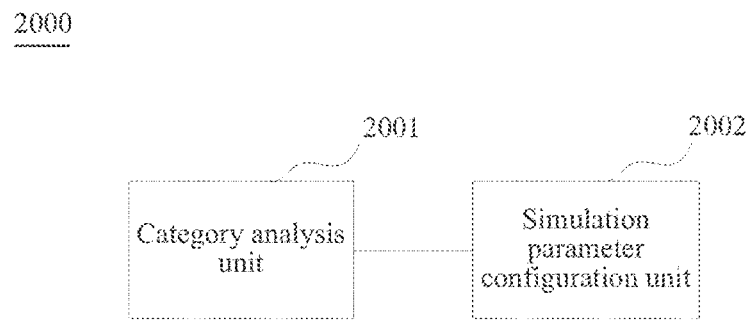
FIG. 14 is a framework diagram of a parameter acquisition module in an embodiment.
Figure 15:
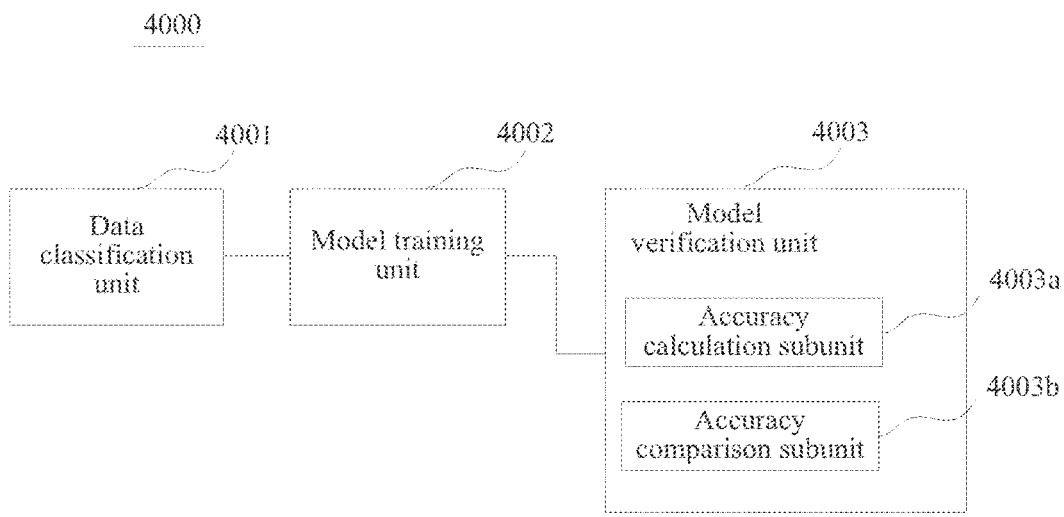
FIG. 15 is a framework diagram of a modeling module in an embodiment.

In one of the embodiments, referring to FIG. 14 as well, the parameter acquisition module 2000 may include:

- a category analysis unit 2001, configured to acquire an application type of the device and the category of the product manufactured by the device, the application type of the device including an application field of the device and a production line in which the device is applied; and
- a simulation parameter configuration unit 2002, configured to acquire a production line configuration simulation parameter matching the category of the product manufactured by the device, the application field of the device and the production line in which the device is applied. The product performance simulation data includes: a product fatigue life, a progressive damage growth and a 3D simulation degree.

By taking the application field of the device, the production line in which the device is applied and the category of the product manufactured by the device as reference of the production line configuration simulation parameter, an actual situation of the production line can be more truly reflected, thus improving the accuracy of the subsequent product performance simulation. In addition, in the same industrial field, a plurality of simulation software may be selected for simulation according to the application category and the product category, so that a plurality of product performance simulation results can be obtained as samples of subsequent machine learning training.

In an embodiment, in order to obtain a more accurate prediction model, referring to FIG. 14 as well, the modeling module 4000 may include:

- a data classification unit 4001, configured to partition the device outlier data to obtain training set data and test set data;
- a model training unit 4002, configured to input the training set data, the production line configuration simulation parameter, the product information and the product performance simulation data into the machine learning model to perform training, so as to obtain an initial product performance prediction model; and
- a model verification unit 4003, configured to input the test set data, the production line configuration simulation parameter, the product information and the product performance simulation data into the initial product performance prediction model, and verify the initial product performance prediction model, so as to obtain the product performance prediction model.

The foregoing modeling module can optimize the product performance prediction model according to different application scenarios, so that a subsequent product performance prediction result more accords with an actual product performance.

In an embodiment, the model verification unit 4003 may include:

- an accuracy calculation subunit 4003a, configured to input the test set data, the production line configuration simulation parameter, the product information and the product performance simulation data into the initial product performance prediction model to test the initial product performance prediction model, so as to obtain a product performance prediction accuracy of the initial product performance prediction model; and
- an accuracy comparison subunit 4003b, configured to compare the product performance prediction accuracy with a preset threshold, and determine a mapping relationship between the device outlier data and a product performance prediction result when the product performance prediction accuracy is higher than the preset threshold, so as to obtain the product performance prediction model.

In an embodiment, the sample acquisition module 1000 is further configured to acquire second sample data, wherein the second sample data includes the device outlier data generated in the foregoing process of manufacturing the product by the device, and the second sample data does not overlap with the first sample data, that is, data in the second sample data is different from data in the first sample data.

Figure 16:
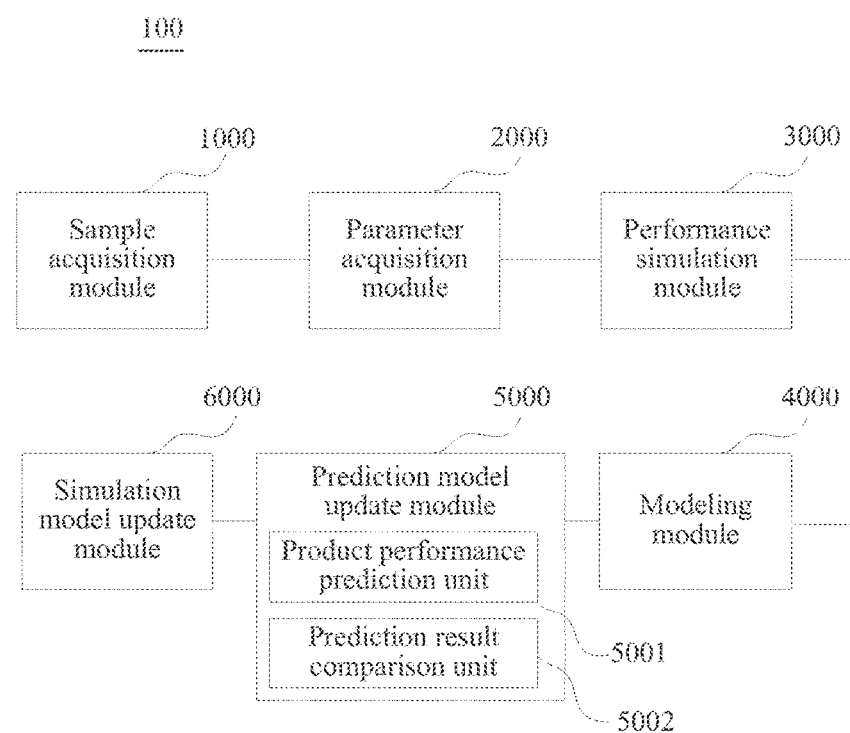
FIG. 16 is a framework diagram of a prediction model update module in an embodiment.

In addition, referring to FIG. 16 as well, the product performance prediction modeling apparatus 100 may further include a prediction model update module 5000, configured to update the product performance prediction model according to the second sample data. In the present embodiment, the product performance prediction model is updated in time according to the second sample data.

In an embodiment, in order to avoid too frequent update when updating the prediction model in time, the prediction model update module 5000 further includes:
- a product performance prediction unit 5001, configured to input the second sample data, the production line configuration simulation parameter, the product information and the product performance simulation data into the product performance prediction model to perform prediction, so as to obtain a product performance prediction result; and
- a prediction result comparison unit 5002, configured to judge whether a deviation between the product performance prediction result and an actual value is greater than a preset prediction standard,
- wherein the prediction model update module 5000 updates the product performance prediction model if the deviation is greater than the preset prediction standard.

In an embodiment, in order to more accurately obtain the product performance prediction result subsequently, it is also necessary to update a simulation model when needed, the product performance prediction modeling apparatus 100 further including:
- a simulation model update module 6000, configured to adjust, if the deviation is greater than the preset prediction standard, the production line configuration simulation parameter until the deviation between the product performance prediction result and the actual value is smaller than the preset prediction standard.

Figure 17:
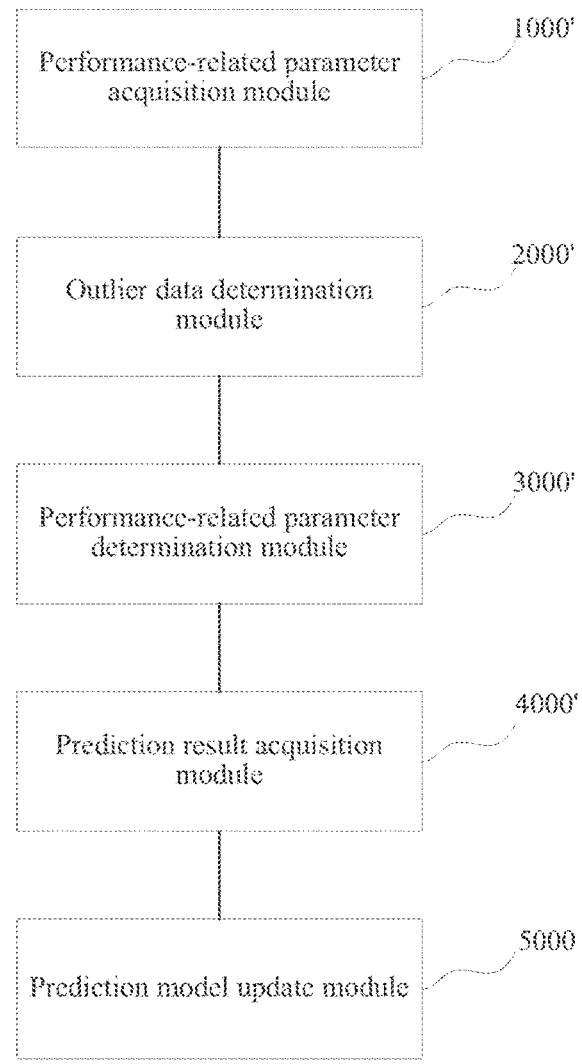
FIG. 17 is a framework diagram of a product performance prediction modeling apparatus in an embodiment.

In an embodiment, the subsequent product performance prediction may be affected by other parameters besides the device outlier data. Therefore, referring to FIG. 17 as well, the product performance prediction modeling apparatus may further include:
- a performance-related parameter acquisition module 1000', configured to acquire original data;
- an outlier data determination module 2000', configured to judge whether the original data pertains to outlier data;
- a performance-related parameter determination module 3000', configured to further judge whether the original data is associated with a product performance if the original data does not pertain to the outlier data; and
- a prediction result acquisition module 4000', configured to input, if the original data is associated with the product performance, the original data into a product performance prediction model for prediction, so as to obtain a product performance prediction result, wherein
- the prediction model update module 5000 is further configured to update the product performance prediction model according to a comparison result between the product performance prediction result and a product performance actual value.

Figure 18:
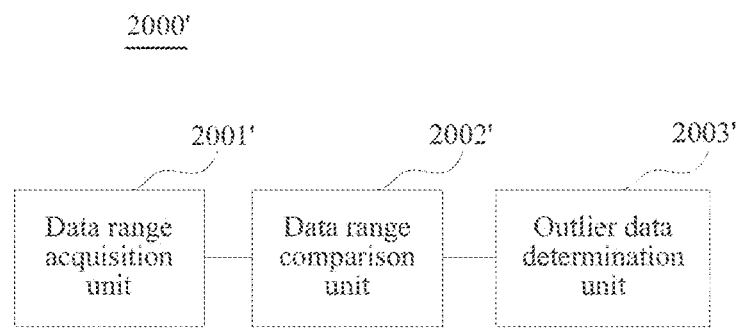
FIG. 18 is a framework diagram of an outlier data determination module in an embodiment.

In an embodiment, referring to FIG. 18 as well, the outlier data determination module 2000' further includes:
- a data range acquisition unit 2001', configured to acquire a preset normal data range;
- a data range comparison unit 2002', configured to compare acquired original data with the normal data range; and
- an outlier data determination unit 2003', configured to judge, when the original data goes beyond the normal data range, that the original data pertains to outlier data.

Specific limitations to the product performance prediction modeling apparatus may refer to limitations to the product performance prediction modeling method above. The descriptions thereof are omitted herein. Various modules in the foregoing product performance prediction modeling apparatus may be entirely or partially implemented by software, hardware or a combination thereof. Each of the foregoing modules may be embedded into or independent of a processor in a computer device 106 in the form of hardware, or may also be stored in a memory in the computer device 106 in the form of software, in order that the processor calls the module to perform an operation corresponding to each of the foregoing modules.

Figure 19:
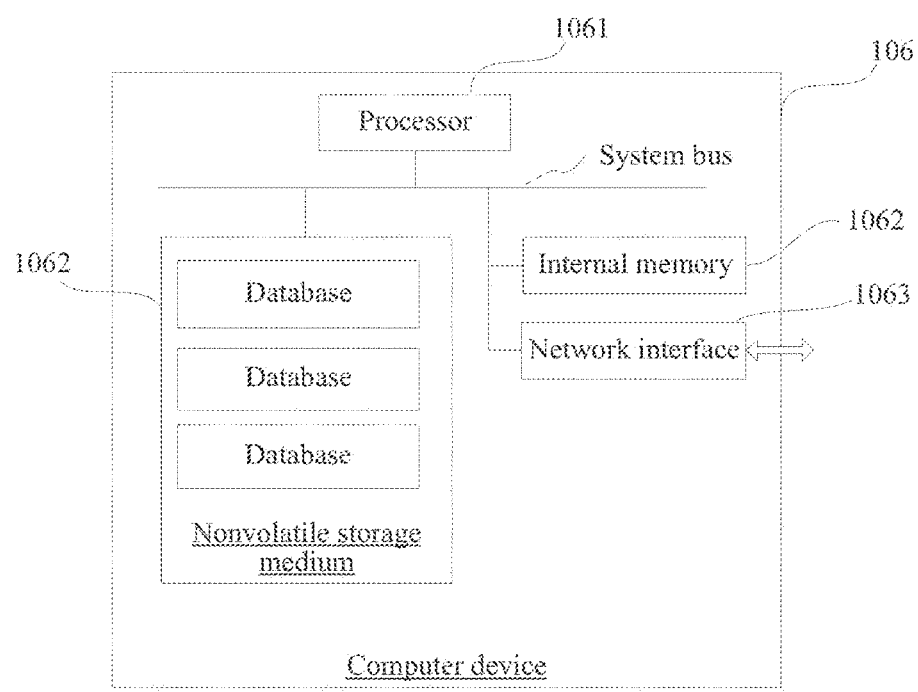
FIG. 19 is a structural diagram of a computer device in an embodiment.

In an embodiment, a computer device 106 is provided. The computer device 106 may be a server, and an internal structure diagram thereof may be as shown in FIG. 19. The computer device 106 includes a processor 1061, a memory 1062, a network interface 1063 and a database 1064, connected through a system bus. The processor 1061 of the computer device 106 is configured to provide calculation and control capabilities. The memory 1062 of the computer device 106 includes a nonvolatile storage medium and an internal memory. The nonvolatile storage medium stores an operating system, a computer program and a database. The internal memory provides an environment for operation of the operating system and the computer program in the nonvolatile storage medium. The database of the computer device 106 is configured to store original data, sample data, various simulation parameters and product performance simulation data, and the like. The network interface of the computer device 106 is configured to communicate with an external terminal through network connection. When the computer program is executed by the processor, a product performance prediction modeling method is implemented. It is understandable that the foregoing memory is merely a specific embodiment. The memory may also be a cloud-end memory such as a cloud platform 105 or the like. The computer processor is connected to the cloud platform 105 through the network interface to acquire various needed data.

Those skilled in the art may understand that the structure shown in FIG. 19 is merely a block diagram of partial structures related to the solution of the present application, and does not limit the computer device 106 to which the solution of the present application is applied. The specific computer device 106 may include components more or less than those shown in the figure, or combine some components, or have different component arrangements.

In an embodiment, a computer device 106 is provided. The computer device includes a memory 1062 and a processor 1061, a computer program is stored in the memory 1062, and when the processor 1061 executes the computer program, the following steps are implemented:
- acquiring first sample data, the first sample data including device outlier data generated in a process of manufacturing a product by a device;
- acquiring a production line configuration simulation parameter of a production line where the device is located, and product information of the product manufactured by the production line;
- selecting, according to the device outlier data, the production line configuration simulation parameter and the product information, a product performance simulation model to perform simulation test on the performance of the product, so as to obtain product performance simulation data; and
- inputting the device outlier data, the production line configuration simulation parameter, the product information and the product performance simulation data into a machine learning model to perform machine learning training, so as to obtain a product performance prediction model.

In addition, when the processor executes the computer program, the foregoing steps corresponding to the product performance prediction modeling method may be implemented.

In an embodiment, a computer device 106 is provided. The computer device includes a memory and a processor, a computer program is stored in the memory, and when the processor executes the computer program, the following steps are implemented:

acquiring device outlier data;

acquiring a production line configuration simulation parameter of a production line where a device generating the device outlier data is located, and product information of the product manufactured by the production line; and inputting the device outlier data, the production line configuration simulation parameter and the product information into a product performance prediction model established by means of the product performance prediction modeling method in any one of the foregoing embodiments, so as to obtain a product performance prediction result corresponding to the device outlier data.

In addition, when the processor executes the computer program, the foregoing steps corresponding to the product performance prediction method may be implemented.

In addition, in an embodiment, a computer-readable storage medium having a computer program stored thereon is provided. When the computer program is executed by a processor, the following steps are implemented:

acquiring first sample data, wherein the first sample data includes device outlier data generated in a process of manufacturing a product by a device;

acquiring a production line configuration simulation parameter of a production line where the device is located, and product information of the product manufactured by the production line;

selecting, according to the device outlier data, the production line configuration simulation parameter and the product information, a product performance simulation model to perform simulation test on the performance of the product, so as to obtain product performance simulation data; and inputting the device outlier data, the production line configuration simulation parameter, the product information and the product performance simulation data into a machine learning model to perform machine learning training, so as to obtain a product performance prediction model.

In addition, when the computer program stored in the storage medium is executed by the processor, the foregoing steps corresponding to the product performance prediction modeling method may be implemented.

In addition, in an embodiment, a computer-readable storage medium having a computer program stored thereon is provided. The following steps are implemented when the computer program is executed by a processor:

acquiring device outlier data;

acquiring a production line configuration simulation parameter of a production line where a device generating the device outlier data is located, and product information of a product manufactured by the production line; and inputting the device outlier data, the production line configuration simulation parameter and the product information into a product performance prediction model established by means of the product performance prediction modeling method in any one of the foregoing embodiments, so as to obtain a product performance prediction result corresponding to the device outlier data.

In addition, when the computer program stored in the storage medium is executed by the processor, the foregoing steps corresponding to the product performance prediction method may be implemented.

In an embodiment, referring to FIG. 1 again, a product performance prediction system may also be provided. The system includes:

at least one sensor 101, 102, 103, the at least one sensor 101, 102, 103 being configured to monitor a production line;

a gateway 104, the gateway 104 being in communication connection with the sensors 101, 102, 103;

a cloud platform 105, the cloud platform 105 being in communication connection with the gateway 104; and a computer device 106, a server being in communication connection with the Internet-of-things cloud platform 105, the computer device 106 including a memory and a processor, the memory storing a computer program, and the steps of the product performance prediction modeling method or the product performance prediction method in any one of the foregoing embodiments being implemented when the processor executes the computer program.

In another embodiment, a product performance prediction system is also provided. The system includes:

at least one sensor 101, 102, 103, the at least one sensor 101, 102, 103 being configured to monitor a production line;

a gateway 104, the gateway 104 being in communication connection with the sensors 101, 102, 103; and a cloud platform 105, the cloud platform 105 being in communication connection with the gateway 104, and including a memory 1062 and a processor 1061, the memory 1062 storing a computer program, and the steps of the product performance prediction modeling method or the product performance prediction method in any one of the foregoing embodiments being implemented when the processor (1061) executes the computer program.

In the present embodiment, the cloud platform integrates a memory and a processor, and a computer program is stored in the memory. The cloud platform operates the computer program through the processor and processes data acquired by the sensor and data input by a user.

In some embodiments provided by the present application, it will be appreciated that the disclosed system, apparatus and method may be implemented in another manner. For example, the apparatus embodiment described above is merely schematic. For example, division of the units is merely logic function division, and other division manners may be adopted during practical implementation. For example, a plurality of units or components may be combined or may be integrated into another system, or some features may be neglected or not executed. In addition, coupling or direct coupling or communication connection between the displayed or discussed components may be indirect coupling or communication connection, through some interfaces, of the apparatus or the units, and may be in electrical, mechanical or other forms.

The units described as separate components may or may not be physically separated, and components displayed as units may or may not be physical units, and namely may be located in the same place, or may also be distributed to a plurality of network units. Some or all of the units may be selected to achieve the purpose of the solutions of the present embodiment according to a practical requirement.

In addition, each function unit in each embodiment of the present invention may be integrated into a processing unit, each unit may also exist independently and physically, and two or more than two units may also be integrated into a unit. The foregoing integrated unit may be implemented in the form of hardware, and may also be implemented in the form of a software function unit.

Those of ordinary skill in the art may understand that all or some flows in the foregoing method embodiment may be completed by instructing related hardware via a computer program, the computer program may be stored in a nonvolatile computer-readable storage medium, during execution of the program, and when the computer program is executed, the flow in each of the foregoing method embodiments may be included. Any reference to a memory, storage, a database or other media used in each embodiment provided by the present invention may respectively include a nonvolatile and/or volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As descriptions other than limitations, the RAM may be obtained in many forms such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM) and the like.

The foregoing product performance prediction modeling method, apparatus, system, computer device and storage medium simulate a product performance according to device outlier data to obtain product performance simulation data, and then perform machine learning by using a machine learning model based on the device outlier data and the product performance simulation data, so that a mapping relationship between the device outlier data and the product performance can be obtained, a product performance prediction model is established, and therefore the product performance prediction model can accurately predict the final product performance in time in case of device exception, thereby improving the accuracy of the product performance prediction. Thus, a producer can early intervene in adjustment, thereby reducing the production cost. Meanwhile, the foregoing method also reduces the amount of data needing to be processed in operation of the computer device during subsequent product performance prediction, improves the efficiency of a computer, and also increases the calculation operation speed of the computer device.

Various technical features in the foregoing embodiments may be randomly combined. For ease of simple description, not all possible combinations of various technical features in the foregoing embodiments are described. However, as long as the combinations of these technical features do not contradict, they should be regarded as falling within the scope of the present specification.

The foregoing embodiment merely describes several implementation manners of the present invention particularly in more detail, but it cannot be thus understood as limitations to the patent scope of the present invention. It should be pointed out that those of ordinary skill in the art may also make several variations and improvements without departing from the concept of the present invention. These variations and improvements all fall within the protection scope of the present invention. Therefore, the patent protection scope of the present invention should be determined by the appended claims.

What is claimed is:

1. A product performance prediction modeling method, comprising:
   acquiring first sample data, the first sample data including first device outlier data generated in a process of manufacturing a product by a device;
   acquiring product information and a production line configuration simulation parameter of a production line relating to location of the device, the product information being product information of the product manufactured by the production line;
   selecting a product performance simulation model to perform a simulation test on a performance of the product to obtain product performance simulation data, wherein the product performance simulation model is selected according to the first device outlier data, the production line configuration simulation parameter and the product information; and
   inputting the first device outlier data, the production line configuration simulation parameter, the product information and the product performance simulation data into a machine learning model to perform machine learning training to obtain a product performance prediction model.

2. The method of claim 1, wherein the acquiring of the production line configuration simulation parameter comprises:
   acquiring an application type of the device and a category of the product manufactured by the device, the application type of the device including an application field of the device and a production line in which the device is applied; and
   acquiring the production line configuration simulation parameter by matching a category of the product manufactured by the device, the application field of the device and the production line in which the device is applied.

3. The method of claim 1, wherein inputting of the first device outlier data, the production line configuration simulation parameter, the product information and the product performance simulation data, comprises:
   partitioning the first device outlier data to obtain training set data and test set data;
   inputting the training set data, the production line configuration simulation parameter, the product information and the product performance simulation data into the machine learning model to perform training to obtain an initial product performance prediction model; and
   inputting the test set data, the production line configuration simulation parameter, the product information and the product performance simulation data into the initial product performance prediction model, and verifying the initial product performance prediction model, to obtain the product performance prediction model.

4. The method of claim 3, wherein the inputting of the test set data, the production line configuration simulation parameter, the product information and the product performance simulation data, comprises:

inputting the test set data, the production line configuration simulation parameter, the product information and the product performance simulation data into the initial product performance prediction model to test the initial product performance prediction model to obtain a product performance prediction accuracy of the initial product performance prediction model; and comparing the product performance prediction accuracy with a threshold, and determining a mapping relationship between the first device outlier data and a product performance prediction result upon the comparing indicating that the product performance prediction accuracy is higher than the threshold, to obtain the product performance prediction model.

5. The method of claim 1, further comprising:

acquiring second sample data, the second sample data including device outlier data generated in the process of manufacturing the product by the device, the second sample data not overlapping with the first sample data; and updating the product performance prediction model according to the second sample data.

6. The method of claim 5, wherein the updating of the product performance prediction model, comprises:

inputting the second sample data, the production line configuration simulation parameter, the product information and the product performance simulation data into the product performance prediction model to perform prediction to obtain a product performance prediction result;

judging whether a deviation between the product performance prediction result and an actual value is greater than a prediction standard; and updating the product performance prediction model upon the judging indicating that the deviation is greater than the prediction standard.

7. The method of claim 6, further comprising:

adjusting, upon the judging indicating that the deviation is than the prediction standard, the production line configuration simulation parameter until the deviation between the product performance prediction result and the actual value is smaller than the prediction standard.

8. The method of claim 1, further comprising:

acquiring third sample data, the third sample data including third device outlier data generated in the process of manufacturing the product by the device;

acquiring product performance test data corresponding to the third sample data;

inputting the third sample data, the production line configuration simulation parameter, the product information and the product performance test data into the product performance prediction model to perform verification;

determining a mapping relationship between the third device outlier data in the third sample data and the product performance test data; and updating the product performance prediction model.

9. The method of claim 1, further comprising:

acquiring original data;

judging whether the original data pertains to outlier data;

further judging whether the original data is associated with a product performance upon the original data being judged to not pertain to the outlier data;

inputting, upon the further judging indicating that the original data is associated with the product performance, the original data into the product performance prediction model for prediction to obtain a product performance prediction result; and updating the product performance prediction model according to a comparison result between the product performance prediction result and a product performance actual value.

10. A product performance prediction method, comprising:

acquiring device outlier data;

acquiring product information and a production line configuration simulation parameter of a production line relating to location of a device generating the device outlier data, the product information being product information of a product manufactured by the production line; and inputting the device outlier data, the production line configuration simulation parameter and the product information into the product performance prediction model established via the product performance prediction modeling method of claim 1, so as to obtain a product performance prediction result corresponding to the device outlier data.

11. The method of claim 10, further comprising:

acquiring an initial product performance simulation model according to the device outlier data, the production line configuration simulation parameter and the product information; and correcting a model parameter of the initial product performance simulation model according to the product performance prediction result, so that a deviation between product performance simulation data of the initial product performance simulation model and the product performance prediction result satisfies a standard, and so that the product performance simulation model is obtained.

12. The method of claim 2, further comprising:

acquiring second sample data, the second sample data including second device outlier data generated in the process of manufacturing the product by the device, the second sample data not overlapping with the first sample data; and updating the product performance prediction model according to the second sample data.

13. The method of claim 3, further comprising:

acquiring second sample data, the second sample data including second device outlier data generated in the process of manufacturing the product by the device, the second sample data not overlapping with the first sample data; and updating the product performance prediction model according to the second sample data.

14. The method of claim 2, further comprising:

acquiring third sample data, the third sample data including third device outlier data generated in the process of manufacturing the product by the device;

acquiring product performance test data corresponding to the third sample data;

inputting the third sample data, the production line configuration simulation parameter, the product information and the product performance test data into the product performance prediction model to perform verification;

determining a mapping relationship between the third device outlier data in the third sample data and the product performance test data; and updating the product performance prediction model.

15. The method of claim 3, further comprising:

acquiring third sample data, the third sample data including third device outlier data generated in the process of manufacturing the product by the device;

acquiring product performance test data corresponding to the third sample data;

inputting the third sample data, the production line configuration simulation parameter, the product information and the product performance test data into the product performance prediction model to perform verification;

determining a mapping relationship between the third device outlier data in the third sample data and the product performance test data; and updating the product performance prediction model.

16. A product performance prediction modeling apparatus, comprising:

a sample acquisition module configured to acquire first sample data, the first sample data including device outlier data generated in a process of manufacturing a product by a device;

a parameter acquisition module configured to acquire product information and a production line configuration simulation parameter of a production line relating to location of the device, the product information being product information of the product manufactured by the production line;

a performance simulation module configured to select a product performance simulation model to perform a simulation test on a performance of the to obtain product performance simulation data, wherein the product performance simulation model is selected according to the device outlier data, the production line configuration simulation parameter and the product information; and a modeling module configured to input the device outlier data, the production line configuration simulation parameter, the product information and the product performance simulation data into a machine learning model to perform machine learning training to obtain a product performance prediction model.

17. A computer device, comprising:

a memory storing a computer program; and a processor configured to, when the processor executes the computer program, cause the computer device to at least acquire first sample data, the first sample data including device outlier data generated in a process of manufacturing a product by a device, acquire product information and a production line configuration simulation parameter of a production line relating to location of the device, the product information being product information of the product manufactured by the production line, select a product performance simulation model to perform a simulation test on a performance of the product to obtain product performance simulation data, wherein the product performance simulation model is selected according to the device outlier data, the production line configuration simulation parameter and the product information, and input the device outlier data, the production line configuration simulation parameter, the product information and the product performance simulation data into a machine learning model to perform machine learning training to obtain a product performance prediction model.

* * * * *